2 Sheets--Sheet 1.
W. A. WOOD.
Mowing-Machines.
No.150,928. Patented May 12, 1874.
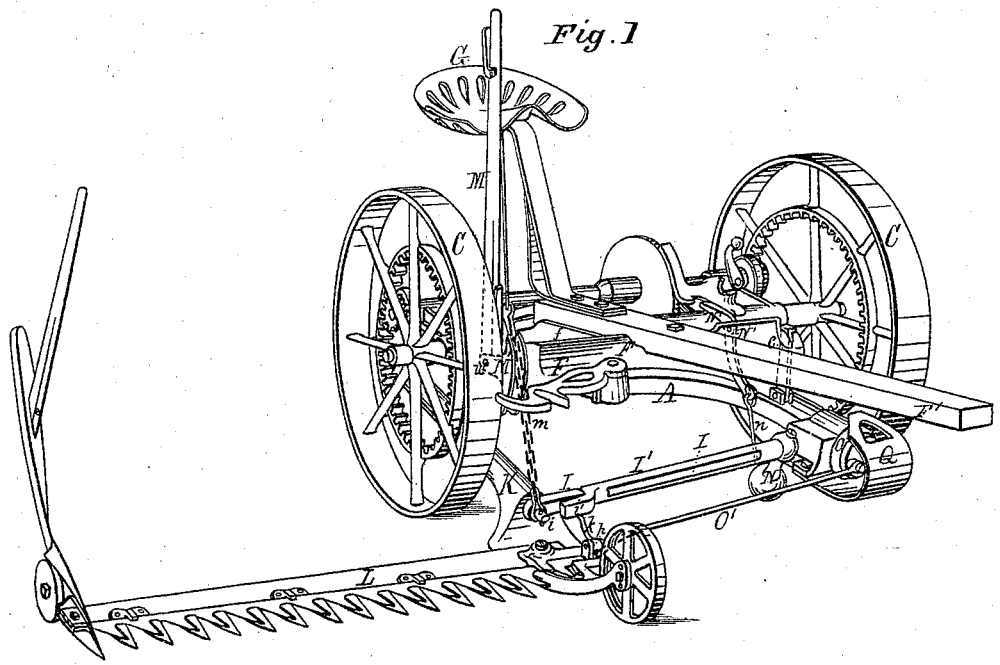
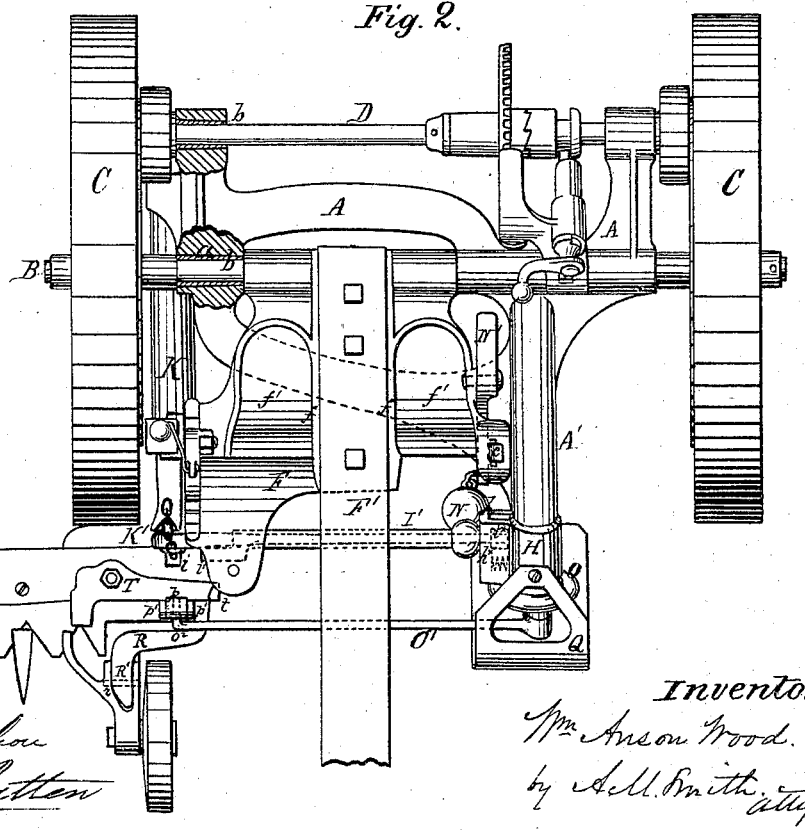
Witnesses. Inventor.

2 Sheets--Sheet 2.

W. A. WOOD.
Mowing-Machines.

No. 150,928. Patented May 12, 1874.

Witnesses
Alex Mahon
Jno. D. Patten

Inventor
Wm Anson Wood.
by A. M. Smith
Atty

AM. PHOTO-LITHOGRAPHIC CO. N.Y. (OSBORNE'S PROCESS.)

UNITED STATES PATENT OFFICE.

WILLIAM A. WOOD, OF VALLEY FALLS, NEW YORK.

IMPROVEMENT IN MOWING-MACHINES.

Specification forming part of Letters Patent No. 150,928, dated May 12, 1874; application filed October 27, 1873.

*To all whom it may concern:*

Be it known that I, WILLIAM ANSON WOOD, of Valley Falls, county of Rensselaer, State of New York, have invented certain new and useful Improvements in Mowing-Machines, of which the following is a full, clear, and exact description, reference being had to the accompanying drawings making part of this specification, in which—

Figure 3:
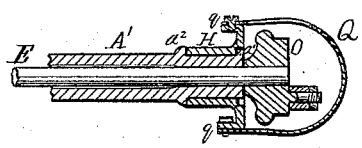
Figure 4:
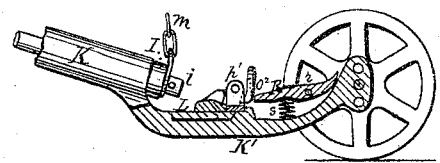
Figure 5:
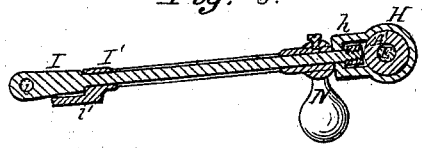
Figure 6:
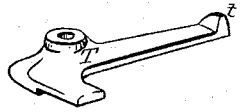
Figure 7:
Figure 8:
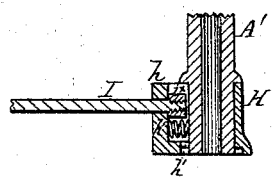
Figure 9:
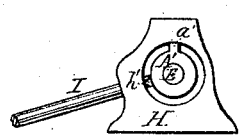

Figure 1 represents a perspective view of my improved machine. Fig. 2 is a plan or top view of the same. Fig. 3 represents the lower or forward end of the crank-shaft sleeve, with the coupling-sleeve, crank-wheel, and crank-wheel guard in section. Fig. 4 represents a section through the inner shoe and spring pitman-holder and clip. Fig. 5 represents a longitudinal section through the coupling rod or brace, and of the sleeve and dog for blocking the hinged finger-bar. Fig. 6 is a perspective view of the clip. Fig. 7 is a side elevation of the ratchet-plate detached, and Figs. 8 and 9 show the connection of the coupling sleeve or collar with the crank-shaft sleeve.

Similar letters of reference denote corresponding parts in all the figures.

My invention consists, first, in a novel means for limiting the downward movement of the hinged cutting apparatus and the coupling arm or brace, for preventing the outer end of said cutting apparatus from falling below a given point, and also for enabling the driver to raise such outer end for passing obstructions; second, in the manner of combining the coupling sleeve or collar with the crank-shaft sleeve; third, in the combination, with the sickle end of the pitman, of a pitman-holder, kept in proper position for holding the pitman united to the sickle-head while in operation by means of a spring; and, lastly, in certain details of construction and arrangement hereinafter fully set forth.

In the accompanying drawings, A represents the main or cutter frame, provided with tubular or sleeve bearings at $a$ for the main axle B, and also for the secondary or bevel wheel and crank-shafts D and E. C C are two independent carrying and driving wheels, mounted on the common axle B. F is the tongue piece or plate, provided with a sleeve at its rear end, surrounding the axle B, and with longitudinal vertical ribs $f$, forming a socket for the tongue F', and on either side thereof with a foot-rest, $f'$, for the driver sitting in seat G. The angle of relation between the frames A and F is determined by an adjustable link, $c$; or, if desired, the adjusting-pin may be withdrawn, leaving the two frames free to vibrate on the axle independently of each other. H is a coupling-sleeve, connected with the lower or forward end of the crank-shaft sleeve A' in such manner as to be free to rotate thereon, and upon the inner side of the sleeve H is a perforated socket, $h$, to receive the upper end of the brace or coupling rod I. (See Figs. 2, 5, 8, and 9.) The forward end of sleeve A¹ is provided with a lip or spur, $a^1$, between which and the flange or collar $a^2$ the coupling-sleeve H is secured and has its bearing, as shown. The socket $h$ is open on its rear end to permit the introduction of a friction-spring, $h^\times$, and also of the nut $i^\times$, which secures the inner end of the brace I, and a slot or notch, $h'$, at the forward end of the socket, permits the passage of the holding-spur $a^1$, after which sleeve H is turned to the proper position for being connected to the finger-bar by the rod or brace I, and the spur $a^1$ serves effectually to retain the coupling-sleeve H on the crank-shaft sleeve A². The spring $h^\times$, by its friction, prevents a too free movement of the coupling sleeve or collar on the crank-shaft sleeve, and serves to give an elasticity to the connection between the two, making it in effect a yielding elastic joint. Other forms of spring or friction device may be substituted for the spiral spring shown. The outer or free end of the rod I is pivoted, at $i$, to the thrust-shoe K, which, at its rear end, is swiveled loosely in a pendent bracket on the rear of the main frame, the connection between the shoe and the bracket being such as to permit the shoe to rock or roll freely on its longitudinal axis, and also to allow the forward end or shoe part to rise and fall in following the surface of the ground, or to be adjusted for passing obstructions and for transportation, the coupling-sleeve H at the inner end of the brace I moving with said brace, and the pivotal connection of brace I and shoe K also serving to permit the freedom of movement of the shoe, as described. The shoe part proper K' of the thrust brace or shoe K is expanded in width underneath and forward of the pivot $i$, and extends laterally on each side of said pivot to form a suitable support for the finger-bar L, and at its inner edge is provided with a vertical lip or flange, $k$, which, when the finger-bar rests upon the ground in a horizontal position, extends up to within a short distance of the inclined brace I, and serves, by coming in contact therewith, to restrict the downward movement of the outer end of the hinged finger-bar within the desired limits. I' is a sleeve mounted and turning on the coupling-brace I, extending nearly its entire length, and provided at its outer end with a spur, $i'$, adapted, when the sleeve I' is rotated, to move underneath the coupling-brace I, and between said brace and the flange $k$ on the shoe K', for blocking and still further limiting the downward movement of the outer end of the finger-bar, and for enabling the driver, by means of the usual lifting-lever and chain M $m$, to readily raise said outer end for passing obstructions, or for other purposes, and causing the cutting apparatus to turn or be raised on the crank-shaft sleeve as a center. To the inner end of the sleeve I' is attached a weighted arm, N, for holding the dog or spur out, when not required for raising the outer end of the bar, as explained; and to the outer end of this lever is connected the lower end of a chain or cord, $n$, which, at its upper end, is connected with the lower forward arm of a foot-lever, N', arranged in convenient position to be operated by the driver for rotating the sleeve I' and blocking finger-bar against downward deflection, as explained. O is the crank-wheel, and O' the pitman connected therewith. Q is a curved shield attached to flanges or lips, $q$, on the upper and lower faces of the coupling-sleeve H, and curved outward or forward of and around the crank-wrist, as shown in Fig. 3, in such manner as to move with the sleeve H, and thereby to maintain a uniform relation to the coupling-sleeve, and also to the coupling and pitman rods. The lower end $o^2$ of the pitman-rod is bent backward at a right angle, or nearly right angle, and enters an eye or perforation in a swivel-block, $p$, which is connected at its upper end or edge, by a horizontal pivot, with upright lugs, $p'$ $p'$, on the inner end of the sickle-bar, this construction allowing the vibrations of the shoe referred to without any cramping of the pitman. Just in front of the lower bent arm $o^2$ of the pitman is located a spring-holder, R, consisting of an arm lying parallel with the sickle-bar, of a length equal to or greater than the throw of the crank, and with its rear face resting against the pitman for holding it engaged with the sickle-bar. This holder is provided with an arm or lug, R', extending forward at an angle of ninety degrees, more or less, to the holder R, and pivoted at its forward end, at $r$, in a socket or between upright lugs formed on the forward or runner part of the shoe, and in rear of this pivot $r$ is located a spring, $s$, which serves to uphold the bar or pitman-holder R in proper position for keeping the pitman connected with the sickle-bar. By pressing the holder down the pitman can be readily disconnected from the sickle. T represents the clip at the inner end of the sickle-bar for sustaining the backward thrust of said bar and holding it down to its work, said clip being provided at its inner or heel end with a spur, $t$, for preventing the sickle from dropping upon the ground when the cutting apparatus is folded for transportation. U is a ratchet-plate, cast separate from the tongue-piece or frame F, and provided with a socket at $u$, and with suitable interlocking spurs, fitting corresponding projections and sockets or recesses in the side of the said tongue-piece. The grooved segment M' of the lifting-lever M is mounted on a pivotal bolt at $u'$, which also serves to secure the ratchet-plate U to the tongue-piece.

In the ordinary method of casting this ratchet-plate with the tongue-piece, great difficulty has been experienced in giving the catches or ratchet-teeth the form and relation essential to enable them to answer the purpose for which they are designed; but by the plan of making the ratchet-piece separate and afterward bolting it to the tongue-piece, it can be made to accomplish such purpose with entire precision.

Parts of the machine not herein particularly described may be made in any usual or preferred manner.

Having now described my invention, what I claim as new, and desire to secure by Letters Patent, is—

1. The combination of the rotating sleeve I, provided with dog or spur $i'$, and with the coupling arm or brace for locking the joint of the shoe or finger-bar therewith, preventing the downward deflection of the outer end of said bar, and enabling the driver to raise the same, as set forth.

2. The combination of the rotating sleeve I', provided with the locking-spur $i'$, with the weighted arm N and foot-lever N', substantially as and for the purpose set forth.

3. The crank-shaft sleeve $A^1$, provided with the spur $a^1$, in combination with the coupling sleeve or collar H, substantially as described.

4. The coupling-sleeve H, provided with perforated socket $h$, in combination with the friction-spring $h$ and crank-shaft sleeve $A^1$, arranged and operating substantially as described.

5. The holder R, applied to the shoe K, and upheld by the spring $s$, for holding the pitman connected with the sickle-bar during the entire length of stroke, all arranged and operating as described.

WM. ANSON WOOD.

Witnesses:
GEO. M. METCALF,
LEONARD KING.